US007996821B2

(12) United States Patent
Sudo et al.

(10) Patent No.: US 7,996,821 B2
(45) Date of Patent: *Aug. 9, 2011

(54) DATA PROCESSOR

(75) Inventors: Ryo Sudo, Kodaira (JP); Shigezumi Matsui, Nishitokyo (JP); Yasunori Matsumoto, Higashiyamato (JP)

(73) Assignees: Renesas Electronics Corporation, Kanagawa (JP); Hitachi ULSI Systems Co., Ltd., Tokyo (JP)

( * ) Notice: Subject to any disclaimer, the term of this patent is extended or adjusted under 35 U.S.C. 154(b) by 1272 days.

This patent is subject to a terminal disclaimer.

(21) Appl. No.: 11/203,978

(22) Filed: Aug. 16, 2005

(65) Prior Publication Data

US 2005/0289515 A1    Dec. 29, 2005

Related U.S. Application Data

(63) Continuation of application No. 09/985,289, filed on Nov. 2, 2001, now Pat. No. 7,003,763.

(30) Foreign Application Priority Data

Nov. 10, 2000    (JP) ................. 2000-342870

(51) Int. Cl.
    *G06F 9/44*    (2006.01)
(52) U.S. Cl. ....................................... 717/128
(58) Field of Classification Search ........... 717/124–135
    See application file for complete search history.

(56) References Cited

U.S. PATENT DOCUMENTS

| | | | | |
|---|---|---|---|---|
| 5,737,516 A | * | 4/1998 | Circello et al. | 714/38 |
| 5,964,893 A | | 10/1999 | Circello et al. | |
| 6,148,381 A | * | 11/2000 | Jotwani | 711/158 |
| 6,378,064 B1 | * | 4/2002 | Edwards et al. | 712/227 |
| 6,530,047 B1 | * | 3/2003 | Edwards et al. | 714/724 |
| 6,732,307 B1 | | 5/2004 | Edwards | |
| 7,003,763 B2 | * | 2/2006 | Sudo et al. | 717/128 |
| 2002/0188822 A1 | * | 12/2002 | Edwards et al. | 712/1 |

FOREIGN PATENT DOCUMENTS

| | | |
|---|---|---|
| EP | 0942373 | 9/1999 |
| JP | 3-90955 | 4/1991 |
| JP | 04-350737 | 12/1992 |
| JP | 05-241880 | 9/1993 |
| JP | 07-230432 | 8/1995 |
| JP | 10-040130 | 2/1998 |
| JP | 11-219303 | 8/1999 |
| JP | 11/249929 | 9/1999 |

OTHER PUBLICATIONS

Hohl et al., "Debug Support on the ColdFire Architecture", May 1996, Motorola Inc., pp. 1-9.*
Uhlig et al., "Trace-Driven Memory Simulation: A Survey", Jun. 1997, ACM, pp. 128-170.*

* cited by examiner

*Primary Examiner* — Ted T Vo
(74) *Attorney, Agent, or Firm* — Mattingly & Malur, PC

(57) ABSTRACT

A data processor having a debugging aid function capable of monitoring a plurality of kinds of internal buses from the outside and identifying each of the buses monitored is provided. A central processing unit (CPU), a debugging aid module, and other circuit modules are mounted on a semiconductor chip. The debugging aid module selects an information transmitting path in accordance with a trace condition from a plurality of information transmitting paths used for the operation of a central processing unit (CPU) or the like, holds trace information obtained according to the trace condition from the selected information transmitting path together with attribute information of the trace information in a buffer circuit, and outputs the information serially to the outside of the semiconductor chip. A plurality of kinds of internal buses can be monitored on the outside, and each of the buses monitored can be identified. The trace information and its attribute information is output serially from the same external terminal.

15 Claims, 14 Drawing Sheets

FIG. 3

| COMMAND | CMD1 | CMD1E | CMD2 | DESCRIPTION |
|---|---|---|---|---|
| STDBY | 4'b0000 | - | - | STANDBY MODE |
| LOST | 4'b0001 | - | - | LOSS OF DATA TO BE OUTPUT |
| BPC | 4'b0010 | - | 4'b(sda)(ssa) | OUTPUT OF BRANCH TRACE INFORMATION. DATA FOLLOWS THE COMMAND IN ORDER OF ADDRESS OF BRANCH DESTINATION, ADDRESS OF BRANCH SOURCE, AND ADDRESS CORRECTION VALUE (=PID).<br>sda: SIZE OF BRANCH DESTINATION ADDRESS<br>ssa: SIZE OF BRANCH SOURCE ADDRESS<br>  sda/ssa=2'b00: LOWER 4 BITS OF ADDRESS<br>  sda/ssa=2'b01: LOWER 8 BITS OF ADDRESS<br>  sda/ssa=2'b10: LOWER 16 BITS OF ADDRESS<br>  sda/ssa=2'b11: 32 BITS OF FULL ADDRESS |
| WDWM | 4'b1001 | 4'b(pt)(bt) | 4'b(sa)(sd) | OUTPUT OF STORED ACCESS INFORMATION OF WINDOW DATA TRACE. DATA FOLLOWS THE COMMAND IN ORDER OF STORED ADDRESS AND STORED DATA.<br>pt: IDENTIFIER OF 1 BIT OF PROCESSOR CORE WHICH OBTAINS INFORMATION<br>bt: IDENTIFIER OF 3 BITS OF BUS WHICH OBTAINS INFORMATION<br>  bt=3'b000: I-BUS TRACE<br>  bt=3'b001: Y-BUS TRACE<br>  bt=3'b010: X-BUS TRACE<br>  bt=3'b011: SIMULTANEOUS TRACE OF X- AND Y-BUSES<br>  bt=3'b100: DMA-BUS TRACE<br>  bt=3'b101 TO 3'b111: RESERVED<br>sa: SIZE OF STORED ADDRESS<br>  sa=2'b00: LOWER 4 BITS OF ADDRESS<br>  sa=2'b01: LOWER 8 BITS OF ADDRESS. WHEN bt=3'b011, LOWER 4 BITS OF X-BUS ADDRESS AND LOWER 4 BITS OF Y-BUS ADDRESS<br>  sa=2'b10: LOWER 16 BITS OF ADDRESS. WHEN bt=3'b011, LOWER 8 BITS OF X-BUS ADDRESS AND LOWER 8 BITS OF Y-BUS ADDRESS<br>  sa=2'b11: 32 BITS OF FULL ADDRESS. WHEN bt=3'b011, 16 BITS OF X-BUS ADDRESS AND 16 BITS OF Y-BUS ADDRESS<br>sd: SIZE OF STORED DATA<br>  sd=2'b01: DATA OF BYTE TYPE (8 BITS)<br>  sd=2'b10: DATA OF WORD TYPE (16 BITS)<br>  sd=2'b11: DATA OF LONG WORD TYPE (32 BITS). WHEN bt=3'b011, 16 BITS OF X-BUS DATA AND 16 BITS OF Y-BUS DATA<br>  sd=2'b10: Y-BUS WRITE ACCESS<br>  sd=2'b11: Y-BUS READ ACCESS |
| WDRM | 4'b1101 | 4'b(pt)(bt) | 4'b(sa)(sd) | OUTPUT OF READ ACCESS INFORMATION OF WINDOW DATA TRACE. DATA FOLLOWS THE COMMAND IN ORDER OF READ ADDRESS AND READ DATA.<br>pt: IDENTIFIER OF PROCESSOR CORE WHICH OBTAINS INFORMATION. (SAME AS pt OF WDWM)<br>bt: IDENTIFIER OF BUS WHICH OBTAINS INFORMATION (SAME AS bt OF WDWM)<br>sa: SIZE OF READ ADDRESS (SAME AS sa OF WDWM)<br>sd: SIZE OF READ DATA (SAME AS sd OF WDWM) |

| BIT: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
|  | CLK1 | CLK0 | BW | BWE | BRE | OC1 | OC0 | BR | WA1 | WA0 | WB1 | WB0 | - | - | TM | EN |
| INITIAL VALUE | 0 | 0 | 0 | 0 | 0 | 0 | 0 | 0 | 0 | 0 | 0 | 0 | 0 | 0 | 0 | 0 |
| R/W | R/W | R/W | R | R | R/W | R/W | R/W | R/W | R/W | R/W | R/W | R/W | R | R | R/W | R/W |

39B

| BIT: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
|  | - | - | - | - | - | - | WA0B2 | WA0B1 | WA0B0 | WB0B2 | WB0B1 | WB0B0 | - | - | - | PT0 |
| INITIAL VALUE | 0 | 0 | 0 | 0 | 0 | 0 | 0 | 0 | 0 | 0 | 0 | 0 | 0 | 0 | 0 | 1 |
| R/W | R | R | R | R | R | R | R/W | R/W | R/W | R/W | R/W | R/W | R | R | R | R |

FIG. 6

15TH AND 14TH BITS  AUDCK SELECT (CLK1, CLK0)

| 15TH BIT (CLK1) | 14TH BIT (CLK0) | DESCRIPTION |
|---|---|---|
| 0 | 0 | SELECT CPU CLOCK RATE OF 1/8 |
| 0 | 1 | SELECT CPU CLOCK RATE OF 1/4 |
| 1 | 0 | SELECT CPU CLOCK RATE OF 1/2 |
| 1 | 1 | SELECT CPU CLOCK RATE OF 1/1 |

13TH AND 12TH BITS: AUD OUTPUT BUS WIDTH (BW, BWE)

| 13TH BIT (BW) | 12TH BIT (BWE) | DESCRIPTION |
|---|---|---|
| 0 | 0 | 4-BIT MODE. TRACE INFORMATION IS OUTPUT FROM AUDATA [3:0] TERMINAL |
| 1 | 0 | RESERVED |
| 0 | 1 | RESERVED |
| 1 | 1 | RESERVED |

10TH AND 9TH BITS  OUTPUT COUNTER MODE (OC1, OC0)

| 10TH BIT (OC1) | 9TH BIT (OC0) | DESCRIPTION |
|---|---|---|
| 0 | 0 | OUTPUT ALL OF ADDRESSES EACH TIME 128 TRACE INFORMATION IS OUTPUT. |
| 0 | 1 | RESERVED |
| 1 | 0 | RESERVED |
| 1 | 1 | ALWAYS OUTPUT ONLY LOWER-BIT PORTION IN WHICH ADDRESS PORTION CHANGES |

11TH AND 8TH BITS: BRANCH TRACE FUNCTION (BRE, BR)

| 11TH BIT (BRE) | 8TH BIT (BR) | DESCRIPTION |
|---|---|---|
| 0 | 0 | BRANCH TRACE IS INVALID |
| 0 | 1 | BRANCH TRACE IS VALID. BOTH BRANCH SOURCE AND BRANCH DESTINATION ADDRESSES ARE OUTPUT. |
| 1 | 0 | BRANCH TRACE IS VALID. ONLY BRANCH SOURCE ADDRESS IS OUTPUT. |
| 1 | 1 | BRANCH TRACE IS VALID. ONLY BRANCH DESTINATION ADDRESS IS OUTPUT. |

7TH TO 4TH BITS: WINDOW DATA TRACING FUNCTION (WA1, WA0, WB1, WB0)

| 7TH BIT (WA1) | 6TH BIT (WA0) | DESCRIPTION |
|---|---|---|
| 0 | 0 | WINDOW A DATA TRACING FUNCTION IS INVALID. |
| 0 | 1 | ONLY WRITE ACCESS IN WINDOW A DATA TRACE IS VALID. |
| 1 | 0 | ONLY READ ACCESS IN WINDOW A DATA TRACE IS VALID. |
| 1 | 1 | BOTH READ AND WRITE IN WINDOW A DATA TRACE ARE VALID. |

| 5TH BIT (WB1) | 4TH BIT (WB0) | DESCRIPTION |
|---|---|---|
| 0 | 0 | WINDOW B DATA TRACE FUNCTION IS INVALID. |
| 0 | 1 | ONLY WRITE ACCESS IN WINDOW B DATA TRACE IS VALID. |
| 1 | 0 | ONLY READ ACCESS IN WINDOW B DATA TRACE IS VALID. |
| 1 | 1 | BOTH READ AND WRITE IN WINDOW B DATA TRACE ARE VALID. |

3RD AND 2ND BITS: RESERVRD BITS
1ST BIT: TRACE MODE (TM)

| 1ST BIT (TM) | DESCRIPTION |
|---|---|
| 0 | FULL TRACE MODE: ALL TRACE INFORMATION GENERATED IS OUTPUT. |
| 1 | REAL TIME TRACE MODE: TRACE INFORMATION IS OUTPUT IN A REAL TIME MANNER WITHOUT SUSPENDING CPU. |

0TH BIT: AUD ENABLE (EN)

| 0TH BIT (EN) | DESCRIPTION |
|---|---|
| 0 | AUD TRACE FUNCTION IS INVALID. |
| 1 | AUD TRACE FUNCTION IS VALID. |

FIG. 7

9TH TO 7TH BITS: TRACE BUS SELECTION OF EACH PROCESSOR CORE FOR WINDOW A
(WA0B2, WA0B1, WA0B0)

| 9TH BIT WA0B2 | 8TH BIT WA0B1 | 7TH BIT WA0B0 | DESCRIPTION |
|---|---|---|---|
| 0 | 0 | 0 | DESIGNATE MAIN BUS OF APPLICABLE CORE. I BUS IN FIG. 1 |
| 0 | 0 | 1 | DESIGNATE ONE OF BUSES IN APPLICABLE CORE. Y BUS IN FIG. 1 |
| 0 | 1 | 0 | DESIGNATE ONE OF BUSES IN APPLICABLE CORE. X BUS IN FIG. 1 |
| 0 | 1 | 1 | RESERVED |
| 1 | 0 | 0 | DESIGNATE ONE OF BUSES IN APPLICABLE CORE. D BUS IN FIG. 1 |
| 1 | 0 | 1 | RESERVED |
| 1 | 1 | 0 | RESERVED |
| 1 | 1 | 1 | RESERVED |

6TH TO 4TH BITS: MONITOR BUS SELECTION OF EACH PROCESSOR CORE FOR WINDOW B
(WB0B2, WB0B1, WB0B0)

| 6TH BIT WB0B2 | 5TH BIT WB0B1 | 4TH BIT WB0B0 | DESCRIPTION |
|---|---|---|---|
| 0 | 0 | 0 | DESIGNATE MAIN BUS OF APPLICABLE CORE. I BUS IN FIG. 1 |
| 0 | 0 | 1 | DESIGNATE ONE OF BUSES IN APPLICABLE CORE. Y BUS IN FIG. 1 |
| 0 | 1 | 0 | DESIGNATE ONE OF BUSES IN APPLICABLE CORE. X BUS IN FIG. 1 |
| 0 | 1 | 1 | RESERVED |
| 1 | 0 | 0 | DESIGNATE ONE OF BUSES IN APPLICABLE CORE. D BUS IN FIG. 1 |
| 1 | 0 | 1 | RESERVED |
| 1 | 1 | 0 | RESERVED |
| 1 | 1 | 1 | RESERVED |

3RD BIT TO 1ST BIT: RESERVED BITS
0TH BIT: PROCESSOR CORE SELECTION (PT0)

| 0TH BIT PT0 | DESCRIPTION |
|---|---|
| 0 | RESERVED |
| 1 | DESIGNATE APPLICABLE CORE. 1 IS FIXED IN FIG. 1 |

ADDRESS DIFFERENCE OUTPUTTING METHOD

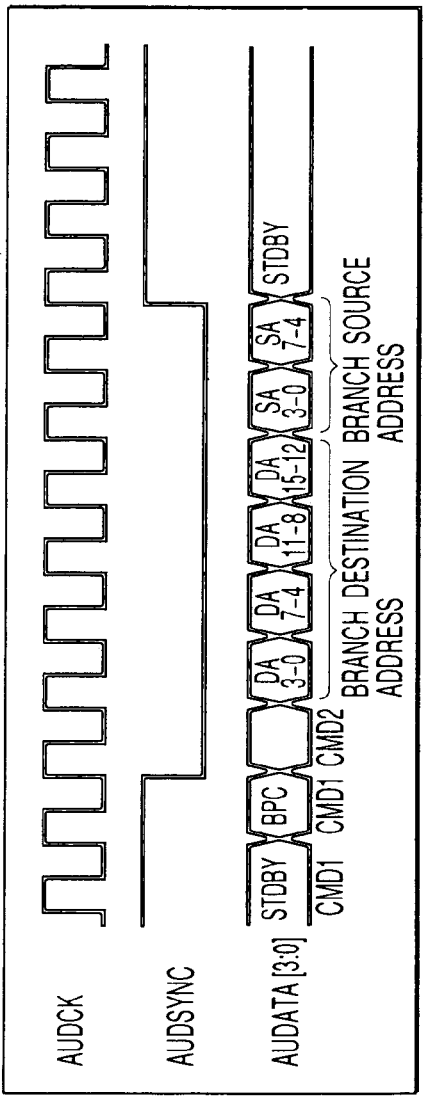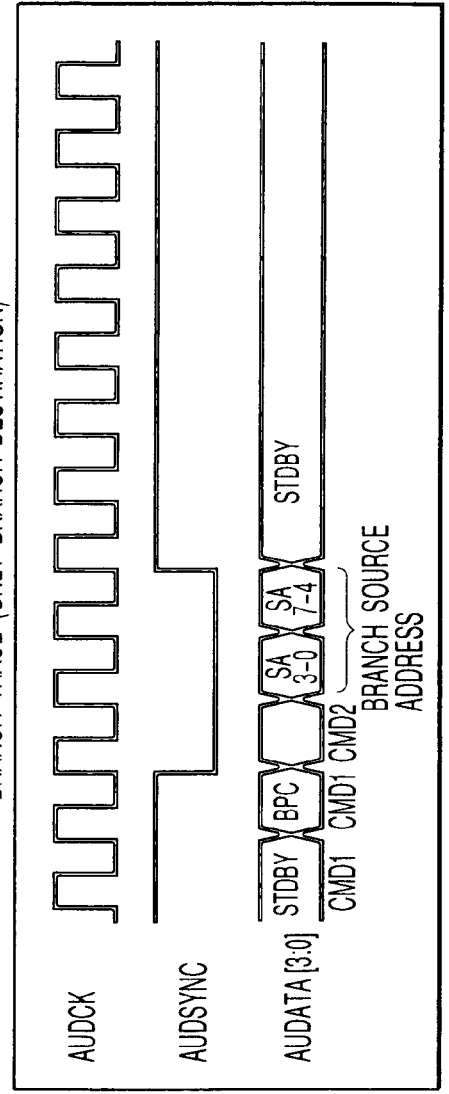

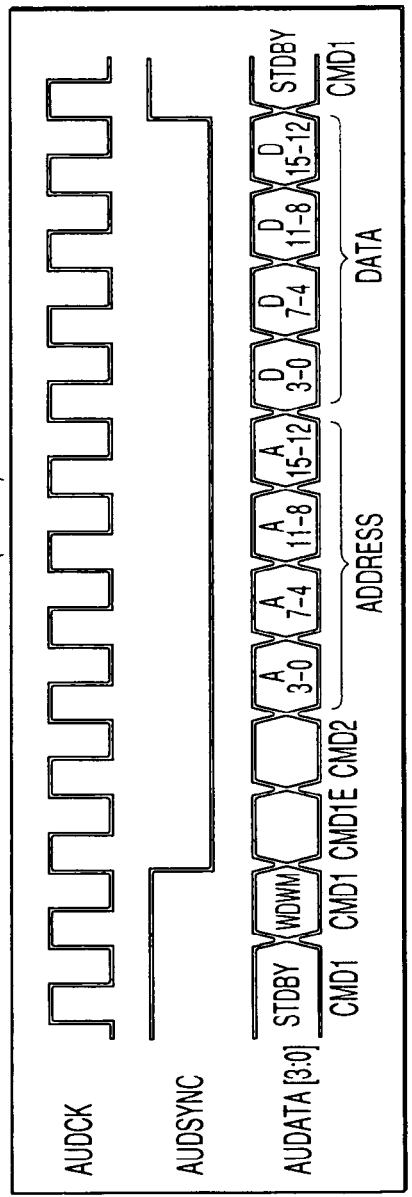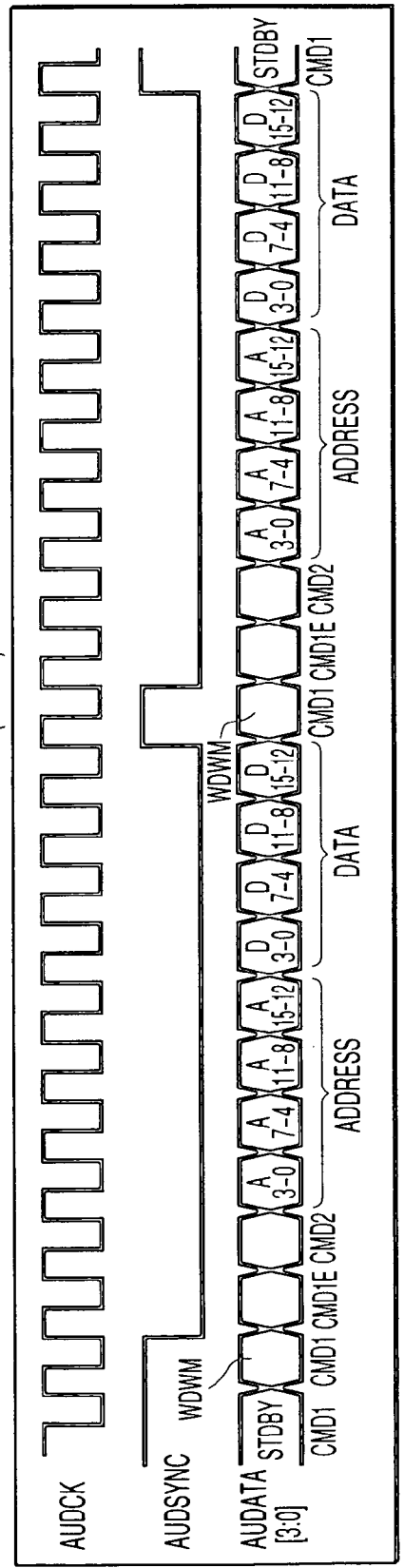

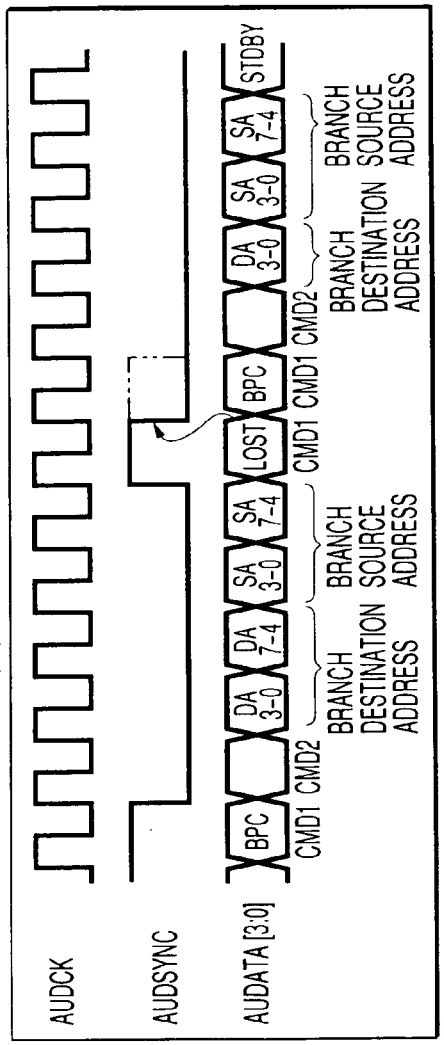
FIG. 14
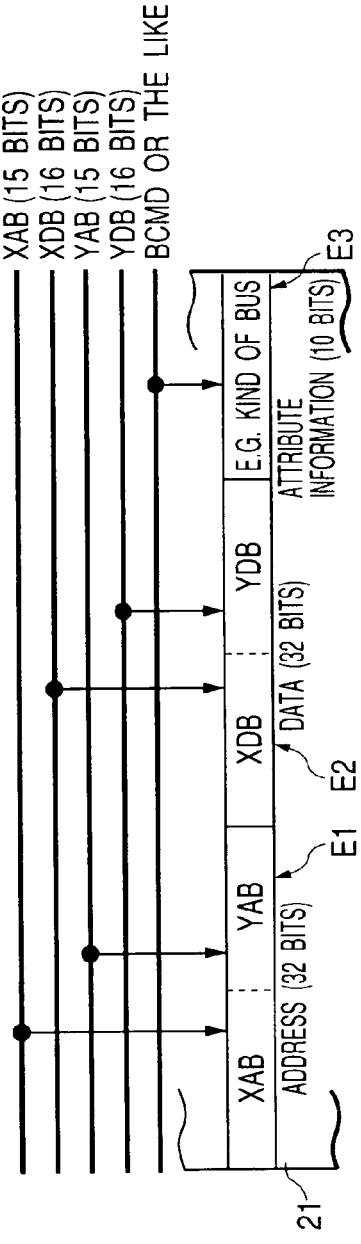
FIG. 15
FIG. 16

DATA PROCESSOR

The present application is a continuation of application Ser. No. 09/985,289, filed Nov. 2, 2001 (now U.S. Pat. No. 7,003, 763), the contents of which are incorporated herein by reference.

This application claims priority to JP 2000-342870, filed Nov. 10, 2000.

BACKGROUND OF THE INVENTION

The present invention relates to a data processor in the form of a semiconductor integrated circuit and, more particularly, a debugging aid function in a data processor. The invention relates to a technique effective for application to, for example, tracing of a plurality of kinds of internal buses built in a data processor.

In a data processor such as a microcomputer, a Central Processing Unit (CPU) and other circuit modules are mounted. Because of demand of higher functions, the number of built-in circuit modules increases and the configuration of internal buses is accordingly becoming complicated. In the case of debugging a system by using the data processor, the internal state of the data processor has to be monitored and provided for debugging while executing a target program. However, the inventor herein has found that, in circumstances that the circuit configuration of the data processor and bus configuration are complicated, it is difficult to monitor internal information of various internal buses while executing the target program and, further, monitor the bus information in a real time manner or in an almost real time manner.

Literature of a technique paying attention to a function of tracing internal data in a data processor includes Japanese Unexamined Patent Application Publication Nos. Hei 11(1999)-219303 and Hei 3(1991)-90955 disclosing a tracing method of a multiprocessor. In the former literature, monitoring of a plurality of buses and addition of identification information of a processor to trace information are not considered. The latter literature describes an example of using identification information indicative of a CPU as the source of bus information.

SUMMARY OF THE INVENTION

However, also in the latter technique, monitoring of a plurality of buses is not considered. In short, attention is not paid to a function of monitoring data of a plurality of buses in parallel and identifying each of the buses monitored. In the latter technique, when it is assumed that bus information and identification information are output from different dedicated terminals in parallel and the bus and identification information is output from a data processor of one chip, due to the limitation of the number of external terminals, there is a case that it cannot be realized.

An object of the invention is to provide a data processor having a debugging aid function by which a plurality of kinds of internal buses can be monitored from the outside and each of the buses monitored can be identified.

Another object of the invention is to provide a data processor having a debugging aid function capable of monitoring a plurality of kinds of internal buses in parallel from the outside.

Further another object of the invention is to provide a data processor having a debugging aid function capable of outputting both information to be traced and identification information of a transmission path of the information to be traced from the same external terminal.

The above and other objects and novel features of the invention will become apparent from the description of the specification and the appended drawings.

An outline of representative aspects of the invention disclosed herein will be briefly described as follows.

(1) A data processor according to a first aspect of the invention includes a Central Processing Unit (CPU) a debugging aid module, and other circuit modules which are mounted on a semiconductor chip. The debugging aid module selects an information transmitting path in accordance with a trace condition from a plurality of information transmitting paths used for operations of the CPU or the other circuit module, holds trace information obtained under the trace condition from the selected information transmitting path and attribute information of the trace information in a buffer circuit, and enables the trace information and the attribute information of the trace information held in the buffer circuit to be serially output in a predetermined format to the outside of the semiconductor chip.

The attribute information is identification information of an information transmitting path, for example, a bus through which corresponding trace information is transmitted. The attribute information denotes identification information of a CPU in multiple CPUs, which performs an operation of making corresponding trace information appear on the information transmitting path.

With the above configuration, a set of information to be traced and its attribute information can be monitored on the outside of the data processor. Consequently, a plurality of kinds of internal buses can be monitored on the outside, and each of the buses monitored can be identified. Since the trace information and its attribute information is serially output to the outside, the information can be output from the same external terminal, and a situation that the debugging aid function cannot be provided due to limitation on the number of external terminals of a packet can be reduced.

(2) In concrete modes of the debugging aid function in the data processor, when a read access is a trace condition, the trace information is address information and data information of a read access, and the attribute information is information indicating that the access type is the read access, bus identification information indicative of the type of an information transmitting path, and size information indicative of size of information to be traced.

When a write access is a trace condition, the trace information is address information and data information of a write access, and the attribute information is information indicating that the access type is the write access, bus identification information indicative of the type of an information transmitting path, and size information indicative of size of information to be traced.

When branching of a command executed by a CPU (for example, branching caused by execution of a branch command by a CPU, interruption, or occurrence of an exception process) is a trace condition and the trace information is branch source address information and branch destination address information, the attribute information is information indicative of trace at the time of branch, information indicative of size of branch source address information to be traced, and information indicative of size of branch destination address information to be traced.

When branching of a command executed by a CPU is a trace condition and the trace information is branch source address information, the attribute information may be information indicative of trace at the time of branch and information indicative of size of branch source address information to be traced. Similarly, when the trace information is branch destination address information, the attribute information may be information indicative of trace at the time of branch and information indicative of size of branch destination address information to be traced.

(3) A data processor according to a second aspect of the invention includes a CPU, a debugging aid module, and other circuit modules which are mounted on a semiconductor chip. The debugging aid module includes: a selection circuit for selecting an information transmitting path in accordance with a trace condition from a plurality of information transmitting paths used for an operation of the CPU or the other circuit module and obtaining trace information in accordance with the trace condition from the selected information transmitting path; a buffer circuit for holding trace information selected by the selection circuit and attribute information of the trace information; an output circuit capable of serially outputting the trace information and the attribute information of the trace information held in the buffer circuit in a predetermined format to the outside of the semiconductor chip; and a control circuit for controlling operations of the selection circuit, the buffer circuit, and the output circuit on the basis of the trace condition designated by the CPU and operating states of the CPU and the other circuit modules.

In the data processor according to the aspect as well, a set of the trace information and the attribute information of the trace information can be monitored, so that the plurality of kinds of internal buses can be monitored on the outside, and each of the buses monitored can be identified. The information to be traced and its attribute information can be output from the same external terminal.

(4) When an FIFO buffer circuit is used as the buffer circuit in the data processor according to the second aspect, it becomes unnecessary to consider an address space in the CPU for storing information. In this case, the control circuit can output an information code from the output circuit to the outside of the semiconductor chip, the information code indicating that the information to be traced is not held in the FIFO buffer circuit and is lost due to a full state of the FIFO buffer circuit. With the configuration, a dropout in the information to be traced can be easily grasped on the outside. To suppress a dropout of the information to be traced, it is sufficient for the control circuit to give an instruction of temporarily suspending a new bus accessing operation on the bus cycle unit basis in response to the full state of the FIFO buffer circuit. In short, it is sufficient to stall a bus access by the CPU or Direct Memory Access controller (DMAC) until a storage area in the FIFO buffer circuit becomes available.

(5) The selection circuit in the data processor according to the second aspect includes: a first selector for selecting an information transmitting path for obtaining trace information from a plurality of information transmitting paths and holding information of the selected information transmitting path on a bus cycle unit basis; a second selector for selecting an information transmitting path for obtaining trace information from a plurality of information transmitting paths and holding information of the selected information transmitting path on the bus cycle unit basis; a command address buffer for holding a command address of a command immediately preceding to a command address being executed at present; and a third selector for selecting one of outputs of the first selector, the second selector, and the command address buffer and supplying the selected output to the buffer circuit. The control circuit is capable of controlling the first and second selectors to select an information transmitting path designated by the trace condition and allows the third selector to output an output of the first selector, the second selector, or the command address buffer in accordance with appearance of an access mode designated by the trace condition.

Consequently, the states of the plurality of internal buses selected by the first and second selectors can be monitored in parallel.

In order to deal with a case where an access mode to be traced on a plurality of buses which can be monitored in parallel appears in the same bus cycle, when an access mode designated by the trace condition appears in the same bus cycle in different information transmitting paths selected by the first selector and second selector, the control circuit temporarily suspends a new bus access operation by the CPU or DMAC and enables information appeared in both of the information transmitting paths in different access modes and held in the first and second selectors to be stored in series into the buffer circuit via the third selector.

(6) As a further concrete mode of a data processor according to the second aspect, a Digital Signal Processor (DSP), an X memory, a Y memory, a DMAC, and a bus state controller are included as the other circuit modules. An I bus, an X bus, a Y bus, and a D bus each for transmitting an address or data, and an IC bus and a DC bus for transmitting bus access control information are provided as the information transmitting paths. The CPU can output an address to the I bus, X bus, and Y bus, receive/transmit data via the I bus, and transmit the bus access control information to the IC bus. The DSP can receive/transmit data via the I bus, X bus, and Y bus and can receive the bus access control information via the IC bus and DC bus. The X memory can receive an address from the I bus, X bus, and D bus, receive/transmit data from/to the I bus, X bus, and D bus, and receive/transmit data from/to the I bus, X bus, and D bus, and receive the bus access control information via the IC bus and the DC bus. The Y memory can receive an address from the I bus, Y bus, and D bus, receive/output data from/to the I bus, Y bus, and D bus, and receive the bus access control information via the IC bus and DC bus. The DMAC can set a transfer control condition via the I bus, output an address to the D bus, and receive/output data from/to the D bus. The bus state controller can output the bus access control information to the DC bus for an access control by the DMAC.

In this case, the control circuit is connected to the IC and DC buses, determines occurrence of an accessing operation matching the trace condition on the basis of access control information supplied via the IC and DC buses, and allows the selection circuit to select a bus used for the accessing operation matching the trace condition.

BRIEF DESCRIPTION OF THE DRAWINGS

FIG. 3 is a diagram for explaining the format of packet data output from an output circuit in FIG. 1.

FIG. 5 is an explanatory diagram showing an example of a control bit configuration of control registers.

FIG. 6 is a diagram for explaining the definition of control bits of the control registers.

FIG. 7 is a diagram for explaining the definition of control bits of the control registers.

FIG. 10 is a timing chart showing a first output example of data AUDATA, a clock signal AUDCK, and a packet synchronous signal AUDSYNC at the time of branch trace (BPC).

FIG. 11 is a timing chart showing a second output example of the data AUDATA, clock signal AUDCK, and packet synchronous signal AUDSYNC at the time of branch trace (BPC).

FIG. 12 is a timing chart showing an output example of the data AUDATA, clock signal AUDCK, and packet synchronous signal AUDSYNC at the time of write access (WDWM).

FIG. 13 is a timing chart showing an output example of the data AUDATA, clock signal AUDCK, and packet synchronous signal AUDSYNC when windows A and B are continuously traced at the time of write access (WDWM).

FIG. 14 is a timing chart showing an output example of the data AUDATA, clock signal AUDCK, and packet synchronous signal AUDSYNC when trace data is dropped during real-time trace.

FIG. 15 is a block diagram schematically showing an example of a connection form of an I bus and an FIFO buffer circuit by a selection circuit.

FIG. 16 is a block diagram schematically showing an example of a connection form of an X bus, a Y bus, and an FIFO buffer circuit by a selection circuit.

DETAILED DESCRIPTION OF THE PREFERRED EMBODIMENTS

Data Processor

Figure 1:
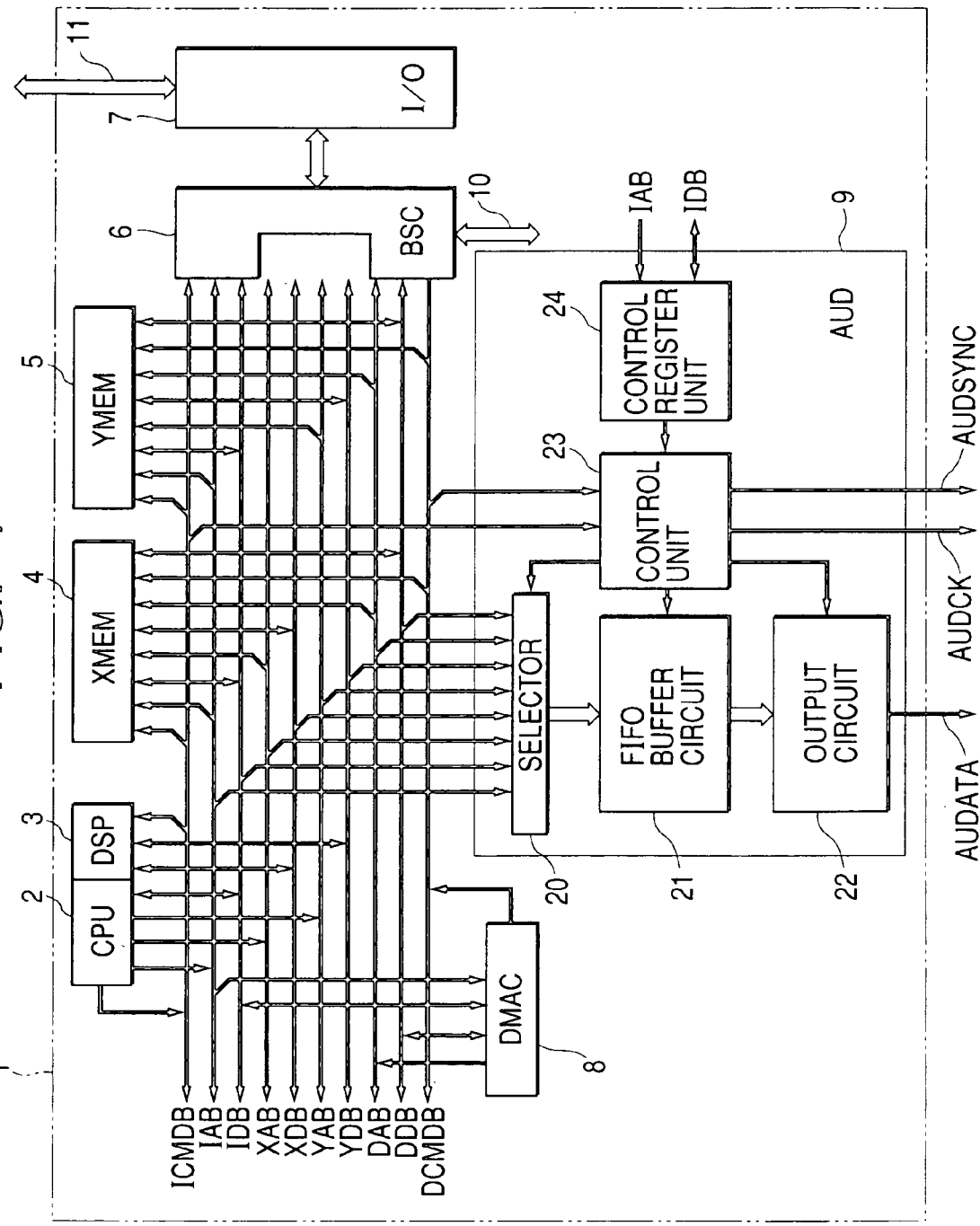
FIG. 1 is a block diagram showing a first example of a data processor according to the invention.

FIG. 1 shows an example a data processor according to the invention. A data processor 1 shown in the diagram is formed on a single semiconductor chip made of single crystal silicon or a semiconductor substrate by, for example, a CMOS integrated circuit manufacturing technique. Although not limited, the data processor 1 includes: a CPU (Central Processing Unit) 2 which takes the form of a RISC (Reduced Instruction Set Computer, for example, 16-bit fixed length instruction set computer) processor; a DSP (Digital Signal Processor) 3 capable of calculating a sum of products at high speed by executing arithmetic operation and data loading/storing operation in parallel; data memories (XMEM and YMEM) 4 and 5 each taking the form of an SRAM (Static Random Access Memory) or the like; a bus state controller (BSC) 6; an input/output (I/O) circuit 7 such as an I/O port; a DMAC (Direct Memory Access Controller) 8; and a debugging aid module (AUD) 9. The CPU 2 can, although not limited, execute an instruction by a pipe-line process and seemingly execute one instruction every cycle of an operation reference clock signal of the CPU 2.

Internal buses of the data processor 1 are roughly divided into a plurality of groups according to the functions and include, as information transmitting paths, I buses (a CPU address bus IAB and a CPU data bus IDB) X buses (an XMEM address bus XAB and an XMEM data bus XDB) Y buses (a YMEM address bus YAB and a YMEM data bus YDB) and D buses (a DMA address bus DAB and a DMA data bus DDB) for transmitting an address and data, and an IC bus (a CPU command bus ICMDB) and a DC bus (DMA command bus DCMDB) for transmitting bus access control information.

The CPU 2 decodes a fetched command by a command decoder (not shown), and calculates address information and data information by using a general register and an arithmetic logic unit (not shown) in accordance with a result of the decoding. The CPU 2 can transmit an address to the address buses IAB, XAB, and YAB, transmit/receive data via the data buses IDB, and transmit bus access control information (bus command) to the command bus ICMDB. The bus command includes information for designating reading or writing operation, data access or instruction fetch, data size, and the like.

The DSP 3 includes, although not shown, a decoder for decoding a DSP instruction, a multiplier, an arithmetic logic unit (ALU), a data register file dedicated to calculation of sum of products, and the like. Although not limited, a control of accessing data necessary for calculation of the DSP 3 is performed by the CPU 2. The DSP 3 receives data read from the data memories (XMEM and YMEM) 4 and 5 by the access control of the CPU 2 and executes a digital signal process. Data of the calculation result output from the DSP 3 is stored into the memories (XMEM and YMEM) 4 and 5 and the like by the access control of the CPU 2. In short, the DSP 3 can receive/transmit data via the data buses IDB, XDB, and YDB, and can receive bus access control information (bus command) via the command buses ICMDB and DCMDB.

Each of the XMEM 4 and YMEM 5 takes the form of an SRAM, a DRAM (Dynamic Random Access Mmoery), or the like and is used as a data memory of the DSP 3 or a work memory of the CPU 2. The XMEM 4 can receive an address via the address buses IAB, XAB, and DAB, receive/transmit data from/to the data buses IDB, XDB, and DDB, and receive bus access control information (bus command) via the command buses ICMDB and DCMDB. The YMEM 5 can receive addresses from the address buses IAB, YAB, and DAB, receive/transmit data from/to the data buses IDB, YDB, and DDB, and receive bus access control information (bus command) via the command buses ICMDB and DCMDB.

In the DMAC 8, transfer control conditions can be set by the CPU 2 via the address bus IAB and the data bus IDB, an address is output to the address bus DAB, and a data transfer control is performed by using the data bus DDB on the inside of the data processor 1 or between the inside and outside of the data processor 1.

The BSC 6 controls activation of a necessary bus cycle for an access to an external bus 11 and an access to a not-illustrated peripheral circuit via a peripheral bus 10 in response to an accessing operation of the CPU 2 or the data transfer control of the DMAC 8. In the case where the destination or source of data transfer performed by the DMAC 8 is a circuit module in the data processor 1, a bus command required by the internal circuit modules is output to the command bus DCMDB by the BSC 6 in response to a DMA request from the DMAC 8.

The debugging aid module 9 includes a selection circuit 20, an FIFO buffer circuit 21, an output circuit 22, and a control unit 23 and a control register unit 24 which form a control circuit. The selection circuit 20 is connected to the I buses (IAB and IDB), X buses (XAB and XDB), Y buses (YAB and YDB) and D buses (DAB and DDB) and selects a bus instructed by trace conditions. When an access mode instructed by the trace conditions appears on the selected bus, the selection circuit 20 selects information on the bus in the access mode. A plurality of buses can be designated in parallel by the trace conditions. The FIFO buffer circuit 21 holds information (trace information) selected by the selection circuit 20 and attribute information of the trace information. The attribute information is, for example, identification information of a bus through which the trace information is transmitted. The output circuit 22 enables the trace information and the attribute information of the trace information held in the FIFO buffer circuit 21 to be serially output as packet data in a predetermined format to the outside of the data processor 1. Although not limited, the serial output data AUDATA is data of a 4-bit unit. In the control register unit 24, the trace conditions are set via the I buses (IAB and IDB) by the CPU 2. The control unit 23 monitors the operating state of the circuit modules such as the CPU 2 via the command buses ICMDB and DCMDB and controls the operations of the selection circuit 20, FIFO buffer circuit 21, and output circuit 22 on the basis of the trace conditions set in the control register unit 24 and the monitored operating state. The control unit 23 outputs the clock signal AUDCK with which the data AUDATA is output synchronously on the 4-bit unit basis and the synchronous signal AUDSYNC of each packet to the outside of the data processor 1.

The debugging aid module 9 is, for example, set into the debugging mode by the data processor 1 and is made operable. It is sufficient to set such a debugging mode when the data processor 1 is connected to a system to be debugged and is allowed to execute a target program. While the data processor 1 executes the target program, an emulator connected on the outside of the data processor 1 can monitor the trace information and the attribute information of the trace information output from the debugging aid module 9. As described above, by the action of the debugging aid module 9, the plurality of kinds of internal buses (I buses, X buses, Y buses, and D buses) of the data processor 1 can be monitored on the outside, and the kind of a bus monitored can be also identified. Since the trace information and its attribute information is output in series to the output, the information can be output from the same external terminal of the data processor 1. Thus, a situation such that the debugging aid function cannot be provided due to limitation of the number of external terminals of a package can be reduced.

Figure 2:
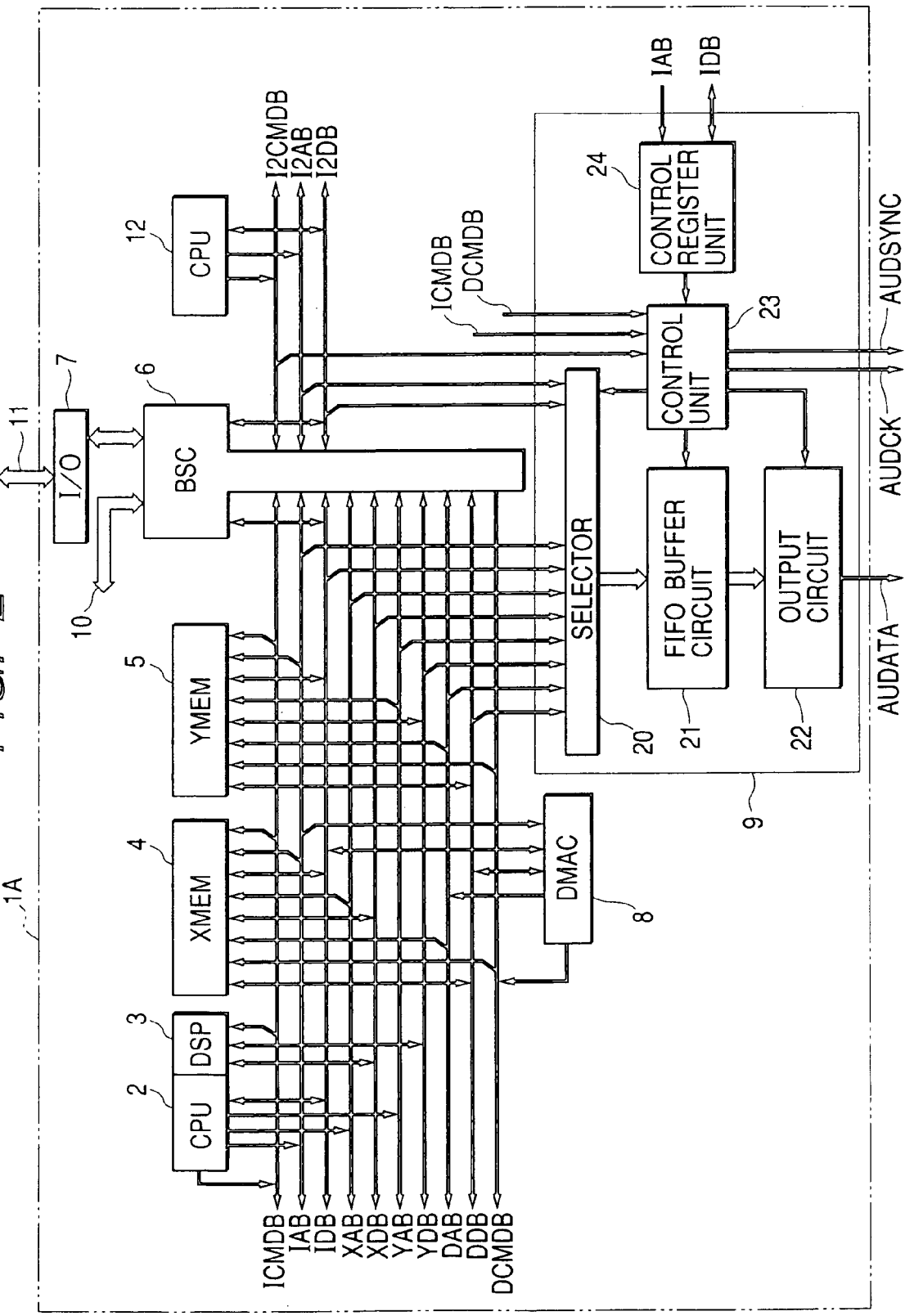
FIG. 2 is a block diagram showing a second example of a data processor according to the invention, including a plurality of Central Processing Units (CPUs).

FIG. 2 shows another example of the data processor. A data processor 1A shown in the drawing includes, different from FIG. 1, a configuration of multiple CPUs. Specifically, the data processor 1A includes a second CPU 12 which is connected to the BSC 6 via a CPU address bus I2AB, a CPU data bus I2DB, and a CPU command bus I2CMDB. The buses I2AB and I2DB are also connected to the selection circuit 20 and information received via the buses I2AB and I2DB can be also monitored. Desirably, CPU identification information by which either the multiple CPU 2 or 12 performs an operation of making the trace information appear on a bus can be recognized is also included as attribute information in the configuration. By receiving the information of the command bus I2CMDB, the control unit 23 also monitors appearance of the access mode on the buses I2AB and I2DB designated by the trace condition. The other configuration is similar to that of FIG. 1, and actions and effects similar to the above are obtained also in the multiple CPU configuration.

Packet Data Format

FIG. 3 shows an example of the format of the packet data output from the output circuit 22 in FIG. 1. The packet data includes attribute information expressed by CMD1, CMDLE, and CMD2, and trace information following the attribute information. CMD1 denotes 4-bit code data indicative of the kind of an access or the like. The kinds of an access as the trace condition in the example are broadly divided into branch trace (BPC) when a branch of command executed by the CPU 2 is a trace condition, read access (WDRM), and write (store) access (WDWM), and peculiar codes area assigned to the accesses. When the branch trace is a trace condition, the trace information is branch source address information and/or branch destination address information. When the read access and/or write access is a trace condition, the trace information is access address information and access data. The subject of the branch trace is a branch executed by a branch instruction of the CPU 2. Alternately, a branch caused by interruption or occurrence of an exception can be the subject.

CMD1E denotes a 4-bit code indicative of the kind of a bus. In the case of the branch trace, since the address information of the branch destination/branch source to be traced is obtained only via the address bus IAB, the code CMD1E is omitted. In the case of the read access and/or write access, processor identification information pt of one bit and bus identification information bt of three bits are provided. The bus identification information bt denotes, according to its value, I bus trace, Y bus trace, X bus trace, X and Y bus trace, and D-bus trace.

CMD2 denotes a 4-bit code indicative of information size. In the case where CMD2 follows the branch trace (BCP) code, sda denotes the size of a branch destination address of two bits. ssa expresses the size of the branch source address of two bits. Since the address information is subjected to a compressing process which will be described hereinafter and the compressed address information is output, according to the value of sda/ssa, the lower four bits, lower eight bits, lower 16 bits, or full 32 bits of address information is output. In the case where sa and sd follow the store access (WDWM) code or read access (WDRM) code, sa denotes the size of the source address of two bits and sd expresses the data size of two bits. The address information is subjected to the compressing process which will be described hereinafter and resultant information is output. The lower four bits of the address information, the lower eight bits (when trace of both the X and Y buses is instructed by bt, lower four bits of X and lower four bits of Y), lower 16 bits (when trace of both the X and Y buses is instructed by bt, lower eight bits of X and lower eight bits of Y), or full 32 bits of the address information are output. The data size indicates eight bits, 16 bits, or 32 bits (in the case where trace of both the X and Y buses is instructed by bt, 16 bits of X and 16 bits of Y) in accordance with the value of sd.

To the code data CMD1, codes of not only the branch trace (BPC), read access (WDRM), and write access (WDWM) but also a standby mode (STDBY), and a data lost mode (LOST) are assigned. The STDBY code indicates that the debugging aid module 9 is in the standby mode and there is no following data. The LOST code indicates that information to be traced is not held in the FIFO buffer circuit 21 due to the full state of the FIFO buffer circuit 21 and is lost. Consequently, a dropout of information to be traced can be easily grasped on the outside. To suppress the dropout of the information to be traced, it is sufficient for the control unit 23 to give an instruction of temporarily suspending a new bus access by the CPU 2 or DMAC 8 on the unit basis of a bus cycle in response to the full state of the FIFO buffer circuit 21. In short, it is sufficient to stall the bus access by the CPU 2 or DMAC 8 until the storage area of the FIFO buffer circuit 21 becomes available.

Control Register for AUD

Figure 4:
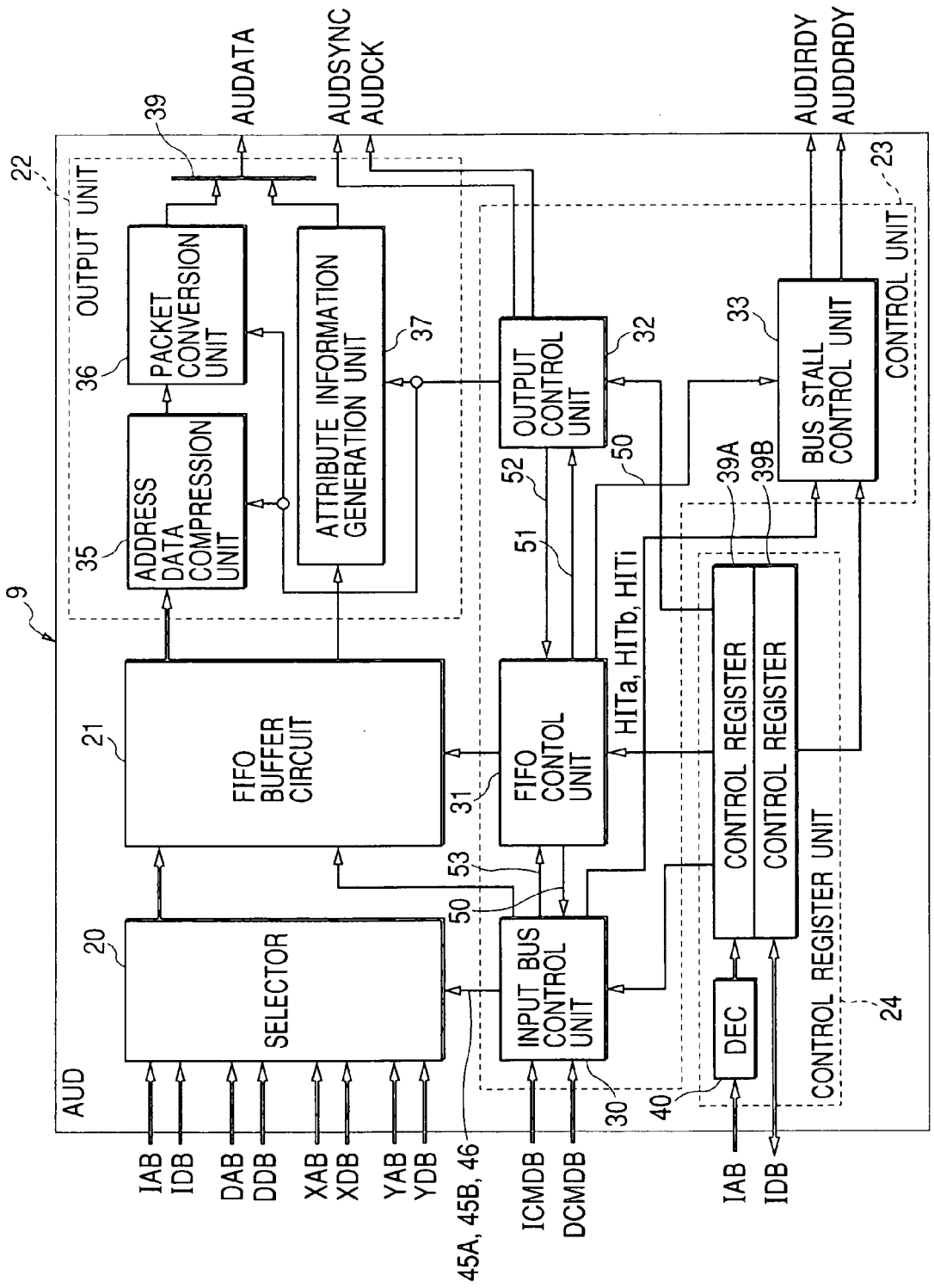
FIG. 4 is a block diagram showing a detailed example of a debugging aid module built in the data processor of FIG. 1.

FIG. 4 shows a detailed example of the debugging aid module 9 in FIG. 1. The control unit 23 has an input bus control unit 30, an FIFO control unit 31, an output control unit 32, and a bus stall control unit 33. The output circuit 22 has an address data compression unit 35, a packet conversion unit 36, an attribute information generation unit 37, and a demultiplexer 38. The control register unit 24 includes control registers 39A and 39B and an address decoder 40.

Each of the control registers 39A and 39B is, for example, a register of 16 bits as shown in FIG. 5 and disposed in the address space of the CPU 2. By supplying the address via the address bus IAB to the address decoder 40, data can be read/written from/to the control registers 39A and 39B via the data bus IDB. An example of the definition of the bits of the control registers 39A and 39B is shown in FIGS. 6 and 7.

As shown in FIG. 6, according to the set values, the branch trace function bits BRE and BR instruct any of the following: invalidity of branch trace, validity of branch trace and output of both branch source and branch destination addresses, validity of branch trace and output of only the branch source address, and validity of branch trace and output of only the branch destination address.

As the trace conditions other than the branch trace, two kinds of trace conditions (window A data trace and window B data trace) can be designated simultaneously. One of the information traces (window A data trace) is determined by designation by window data trace function bits WA1 and WA0 in FIG. 6 and designation by trace bus selection function bits WA0B2, WA0B1, and WA0B0 of processors for window A in FIG. 7. The former function bits WA1 and WA0 instruct, according to the values, invalidity of the window A data tracing function, validity of only the write access in the window A data trace, validity of only the read access in the window A data trace, and validity of both the write and read accesses in the window A data trace. According to the values of the function bits WA0B2, WA0B1, and WA0B0, one of the I bus, X bus, Y bus, and D bus is designated as a bus used for the window A data trace. The other information trace (window B data trace) is determined by designation by window data trace function bits WB1 and WB0 in FIG. 6 and designation by trace bus select bits WB0B2, WB0B1, and WB0B0 of processors for window B in FIG. 7. According to the values of the former function bits WB1 and WB0, invalidity of the window B data tracing function, validity of only the write access in the window B data trace, validity of only the read access in the window B data trace, or validity of both the write and read accesses in the window B data trace is instructed. According to the values of the function bits WB0B2, WB0B1, and WB0B0, one of the I bus, X bus, Y bus, and D bus is designated as a bus used for the window B data trace.

Since the number of the CPU is one in FIG. 1, the value of a processor core bit PT0 is fixed to "1". In the example of FIG. 2, the CPU 12 may be designated when PT0=0, and the CPU 2 may be designated when PT0=1. Alternately, the CPU 2 may be designated when PT0=0, and the CPUs 2 and 12 may be designated when PT0=1.

According to the value of a trace mode bit TM shown in FIG. 6, a full trace mode or a real-time trace mode is designated. In the full trace mode, all the trace information is output. When the FIFO buffer circuit 21 becomes full, until a space becomes available, the CPU 2 is stalled by the bus stall control unit 33. In the real-time trace mode, the trace information is output in a real-time manner without suspending the CPU 2. When the FIFO buffer circuit 21 becomes full or trace information is generated simultaneously in the windows A and B, the attribute information generation unit 37 issues the LOST code.

Selection Circuit

Figure 8:
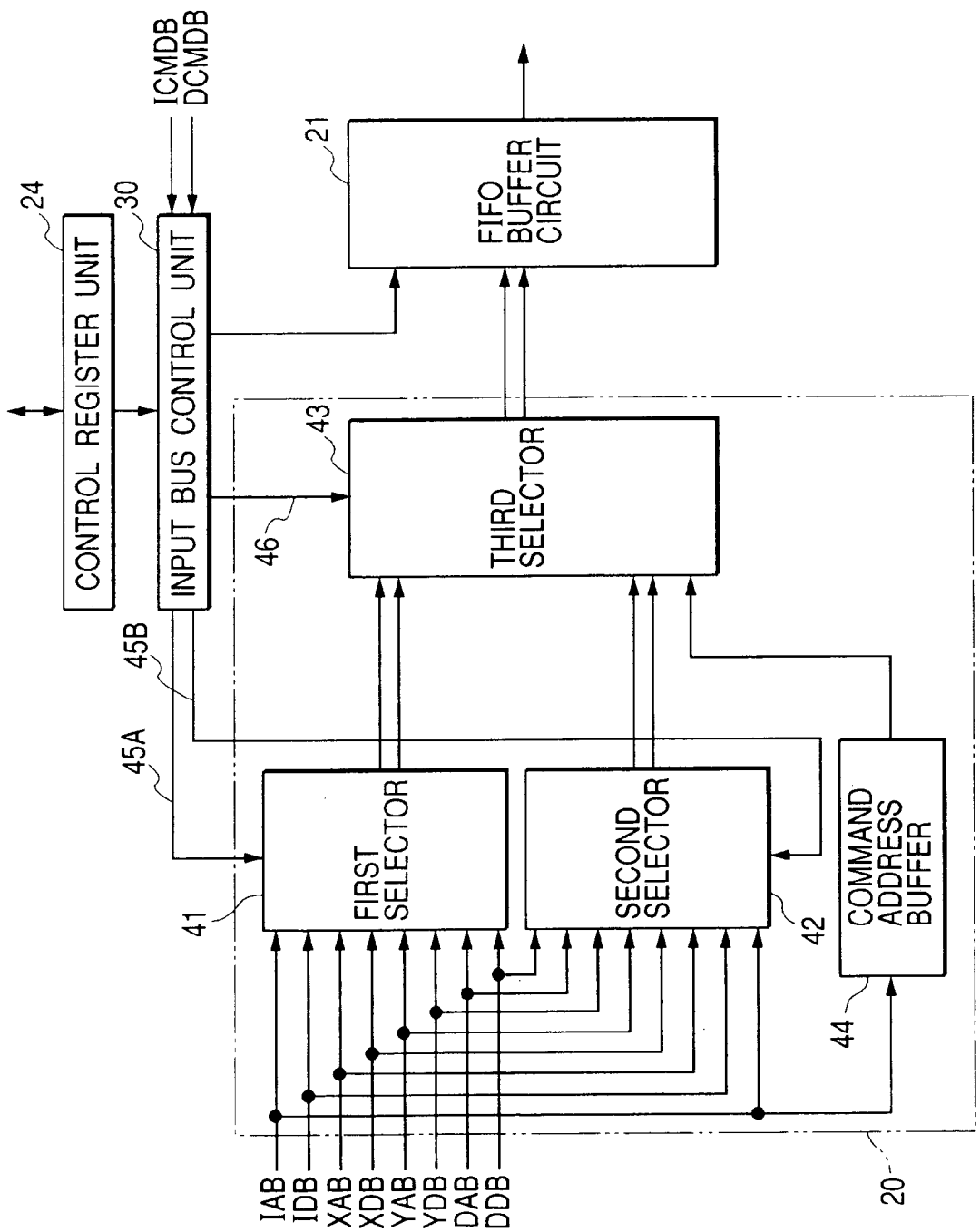
FIG. 8 is a block diagram specifically showing an example of a selection circuit of the debugging aid module of FIG. 4.
Figure 9A:
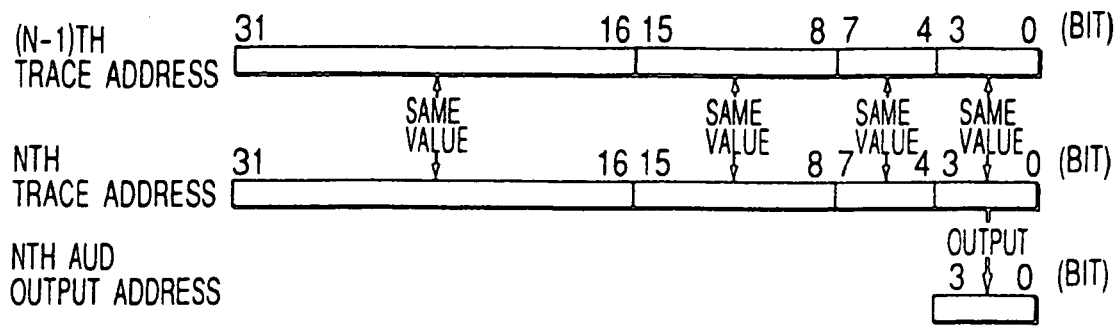
FIGS. 9A to 9E are explanatory diagrams showing an example of an address information compressing method.
Figure 9B:
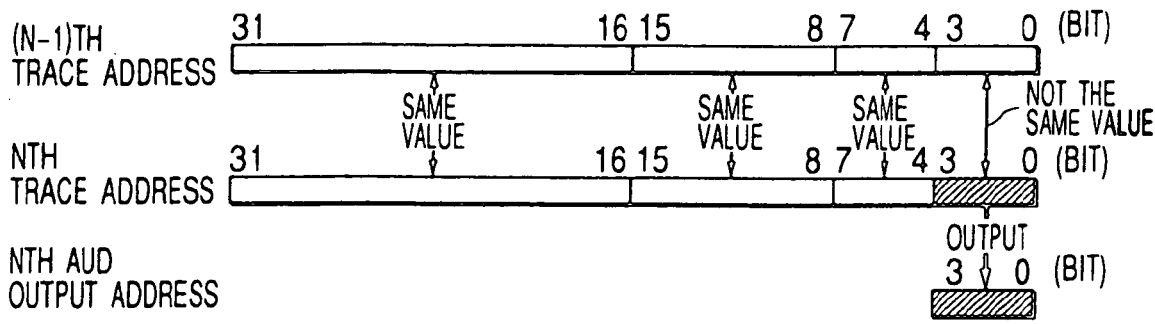
Figure 9C:
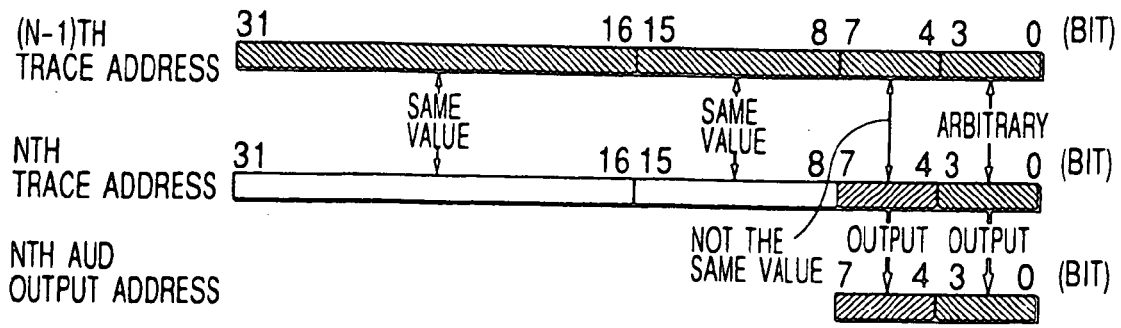
Figure 9D:
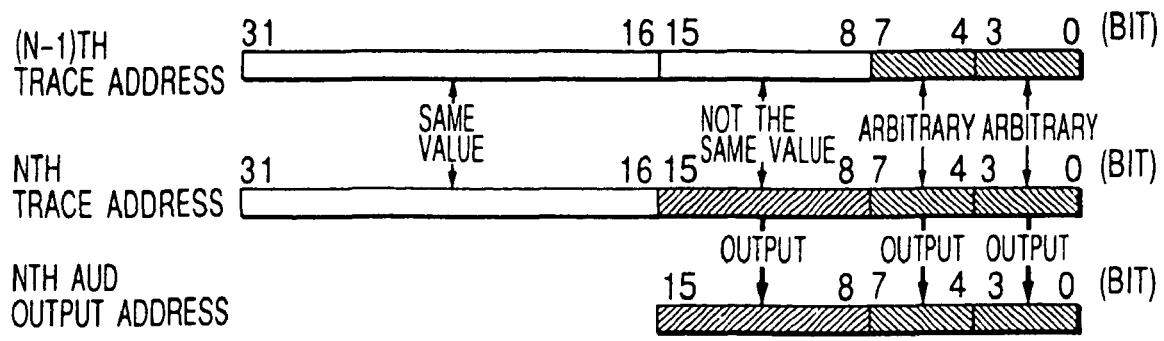
Figure 9E:
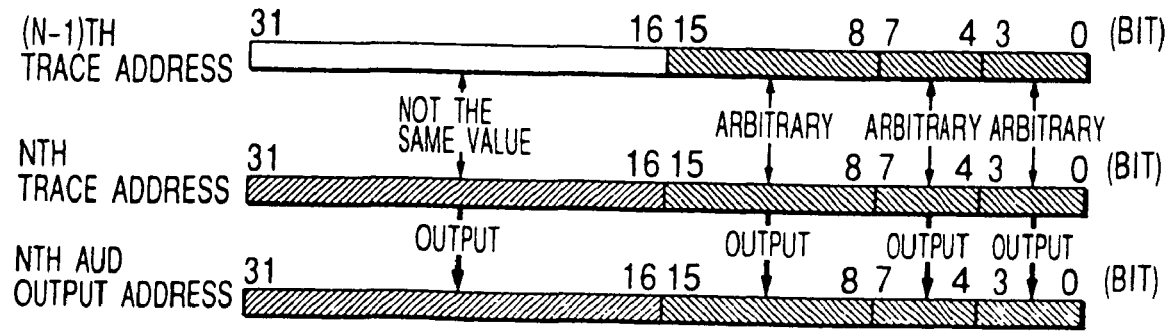

FIG. 8 shows an example of the selection circuit. The selection circuit 20 shown in the diagram includes a first selector (window A selector) 41, a second selector (window B selector) 42, a third selector 43, and a command address buffer 44. The first selector 41 selects a bus for obtaining information to be traced from the I buses (IAB and IDB), X buses (XAB and XDB), Y buses (YAB and YDB), and D buses (DAB and DDB), and holds information of the selected bus on the bus cycle unit basis. The second selector 42 similarly selects a bus for obtaining information to be traced from the I buses (IAB and IDB), X buses (XAB and XDB), Y buses (YAB and YDB), and D buses (DAB and DDB), and holds information of the selected bus on the bus cycle unit basis. The command address buffer 44 holds a command address immediately preceding the command address being executed by the CPU 2 at present. In short, the command address buffer 44 receives the command address transmitted to the address bus IAB as an I bus and, even the next command address is input, holds the command address for a predetermined period until execution of the next command address is completed. The third selector 43 selects one of the outputs from the first selector 41, the second selector 42, and the command address buffer 44 and supplies the selected one to the FIFO buffer circuit 21.

At this time, the input bus control unit 30 supplies a selection signal 45A of a bus designated by trace bus select bits WA0B2, WA0B1, and WA0B0 of processor cores for the window A in the control register 39B to the first selector 41. Similarly, the input bus control unit 30 supplies a selection signal 45B of a bus designated by trace bus select bits WB0B2, WB0B1, and WB0B0 of processor cores for the window B in the control register 39B to the second selector 42. The input bus control unit 30 outputs a selection signal 46 to the third selector 43. By the selection signal 46, an output of either the first selector 41, the second selector 42, or the command address buffer 44 is selected in accordance with the appearance of an access mode designated by the branch trace function bits BRE and BR and the window data trace function bits WA1, WA0, WB1, and WB0 of the control register 39A. It is sufficient to determine whether the access mode designated as a trace condition has appeared or not by monitoring the states of the command buses ICMDB and DCMDB. For example, when the access mode designated by the trace condition appears on the bus selected by the first selector 41, the input bus control unit 30 allows the third selector 43 to select the output of the first selector 41. When the access mode designated by the trace condition appears on the bus selected by the second selector 42, the input bus control unit 30 allows the third selector 43 to select the output of the second selector 42. When execution of the branch command is detected in a state where the branch trace is instructed validly, after the next command address as a branch destination command is input from the address bus IAB to the first selector 41, the input bus control unit 30 allows the third selector 43 to supply the branch source command address held by the command address buffer 44 and the branch destination address held by the first selector 41 to the FIFO buffer circuit 21.

The states of the internal buses selected by the first and second selectors 41 and 42 can be monitored in parallel by the selection circuit 20. There is a case such that the access mode of a trace appears in the same bus cycle on a plurality of buses which can be monitored in parallel. In a state where a full trace mode is designated, when the access mode designated by the trace condition appears in the same bus cycle in the buses selected by the first and second selectors 41 and 42, the input bus control circuit 30 makes the bus stall control unit 33 temporarily suspends command execution by the CPU 2 or data transfer operation by the DMAC. The input bus control circuit 30 allows trace information appeared on both of the buses in the access modes and held by the first and second selectors 41 and 42 to be serially stored in the FIFO buffer circuit 21 via the third selector 43.

Bus Stalling Control

A bus stalling control will now be described in detail with reference to FIG. 4. The input bus control unit 30 determines whether the mode matching the trace condition appears or not on the basis of bus commands from the command buses ICMDB and DCMDB, and outputs occurrence of the mode matching the trace condition as hit signals HITa, HITb, and HITi. The hit signal HITa is activated when the mode matches the window A data trace condition (when trace data is obtained via the first and third selectors 41 and 43). The hit signal HITb is activated when the mode matches the window B data trace condition (when trace data is obtained via the second and third selectors 42 and 43). The hit signal HITi is activated when the command executed by the CPU 2 is branched. The input bus control unit 30 sends a write request to the FIFO control unit 31 by a signal 53 when the hit signals HITa, HITb, and HITi are activated.

The FIFO control unit 31 controls data reading/writing operation in a first-in first-out manner to the FIFO buffer circuit 21. When a storage area to which data can be written becomes full, a full-state signal 50 is made active. When there is no data which can be read, an empty-state signal 51 is made active. A read request to the FIFO control unit 31 is supplied by a signal 52.

To the bus stall control unit 33, the hit signals HITa, HITb, and HITi, full-state signal 50, and setup data of the control registers 39A and 39B are input. When the full trace mode is instructed by the trace mode bit (TM) and the hit signal HITa, HITb, or HITi is activated in the full state, the bus stall control unit 33 makes a bus ready signal AUDIRDY for the I bus or a bus ready signal AUDDRDY for the D bus inactive. In the example, the bus ready signal AUDIRDY or AUDDRDY is supplied to the BSC 6. When the bus ready signal AUDIRDY is made inactive, a bus access to the I bus is prevented. When the bus ready signal AUDDRDY is made inactive, a bus access to the D bus is prevented.

LOST Flag Control

Although not shown, in the case where a real-time trace mode is instructed by the trace mode bit (TM), each time the hit signal HITa, HITb, or HITi is activated when the FIFO buffer circuit 21 is full, the bus stall control unit 33 allows a LOST flag in the input bus control unit 30 to be sequentially held as a set state. After that, when a first empty space appears in the FIFO buffer circuit 21, the input bus control unit 30 controls to write information of the set number of the LOST flag into the FIFO buffer circuit 21 via the FIFO control unit 31.

Output Control

An output control performed by the output circuit 22 will now be described in detail with reference to FIG. 4. The input bus control unit 30 decodes the bus command supplied via the command buses ICMDB and DCMDB to obtain bus access control information used as attribute information every bus cycle and supplies the information to the FIFO buffer circuit 21. The FIFO buffer circuit 21 stores the corresponding bus access control information together with address information to be traced, data information, and the like into, for example, the same FIFO storage stage. An instruction of writing data to the FIFO buffer circuit 21 is given by the signal 53. Reading of data from the FIFO buffer circuit 21 is instructed by the signal 52.

The attribute information generation unit 37 receives the bus access control information read from the FIFO buffer circuit 21 and generates attribute information in the form expressed by CMD1, CMD1E, and CMD2 descried in FIG. 3 under control of the output control unit 32 which receives set values of the control registers 39A and 39B. The address data compression unit 35 compresses the address information as information to be traced which is read from the FIFO buffer circuit 21 and outputs the compressed address information.

The address information is compressed by, as shown in FIG. 9, a method of outputting a difference between the address information and the immediately preceding address information. Specifically, as shown in FIGS. 9A and 9B, when all the bits coincide with each other or when discrepancy occurs within the lower four bits, only the lower four bits in the address information of this time is to be output. As shown in FIG. 9C, when there is a discrepant bit in the range from the fifth bit to the eighth bit, only the lower eight bits of the address information of this time are to be output. As shown in FIG. 9D, when there is a discrepant bit in the range from the ninth bit to the 16th bit, only the lower 16 bits of the address signal of this time is to be output. As shown in FIG. 9E, when there are discrepant bits in the range from the 17th bit to the 32nd bit, the full address information of this time is to be output. The packet conversion unit 36 converts the format of address information or data information in accordance with the packet data format described in FIG. 3 in accordance with the control of the output control unit 32.

The output control unit 32 selects the attribute information expressed by CMD1, CMD1E, and CMD2 and trace information output from the packet conversion unit 36 by the demultiplexer 39 in a predetermined order and outputs the selected information as monitor data AUDATA to the outside synchronously with the clock signal AUDCK to change a packet synchronous signal AUDSYNC every packet.

FIGS. 10 and 11 show an output example of data AUDATA, clock signal AUDCK, and packet synchronous signal AUDSYNC at the time of the branch trace (BPC). In FIG. 10, after MD2, branch destination address information of 16 bits follows as DA, and branch source address information of eight bits follows as SA. In FIG. 11, after MD2, branch source address information of eight bits follows as SA.

FIG. 12 shows an output example of data AUDATA, clock signal AUDCK, and packet synchronous signal AUDSYNC at the time of write access (WDWM). After MD2, address information of 16 bits follows as A and data information of 16 bits follows as D.

FIG. 13 shows an output example of the data AUDATA, clock signal AUDCK, and packet synchronous signal AUDSYNC at the time of continuous trace of the windows A and B at the time of write access (WDWM). In successive two output operations, after MD2, address information of 16 bits follows as A and data information of 16 bits follows as D.

FIG. 14 shows an output example of the data AUDATA, clock signal AUDCK, and packet synchronous signal AUDSYNC when a dropout occurs in the trace data in the real-time trace. When a data dropout occurs, the LOST code is output. By the output of the LOST code, the packet synchronous signal AUDSYNC is set to the low level. When the next BPC code is output, the packet synchronous signal AUDSYNC has already been set to the low level. A packet output after the LOST state can be discriminated from the other packet outputs also by the packet synchronous signal AUDSYNC. The LOST code is generated by the attribute information generation unit 37 on the basis of the information of the set number of the LOST flag stored in the FIFO buffer circuit 21.

Connection Form of Bus and FIFO Buffer Circuit

FIG. 15 schematically illustrates an example a connection form of the I buses and the FIFO buffer circuit by the selection circuit 20. Each of the buses IAB and IDB is of 32 bits. One storage stage in the FIFO buffer circuit 21 is of 74 bits in this case, in which a 32-bit address storage area E1, a 32-bit data storage area E2, and a 10-bit attribute information area E3 are allocated.

FIG. 16 schematically illustrates an example of a connection form of the X buses, Y buses, and FIFO buffer circuit. The number of bits of each of the X buses and Y buses is equal to or smaller than the half of the bits of the I bus. Although not limited, each of the address buses XAB and YAB has 15 bits, and each of XDB and YDB has 16 bits. One storage stage in the FIFO buffer circuit 21 is of 74 bits. In a manner similar to FIG. 15, a 32-bit address storage area E1, a 32-bit data storage area E2, and a 10-bit attribute information area E3 are allocated. In the address area E1, two kinds of address buses XAB and YAB are connected in parallel in high-order and low-order storage areas. In the data area E2, the two kinds of data buses XDB and YDB are connected in parallel in high-order and low-order storage areas. Consequently, when the X buses (XAB and XDB) and the Y buses (YAB and YDB) are targets to be traced and an access mode matching the trace condition appears in both of the buses, both of the trace information can be stored at once into the FIFO buffer circuit 21. In this case, therefore, in the real-time trace mode, the trace information is not lost. In the full trace mode, bus stall does not occur.

Trace Information not Through Bus

Figure 17:
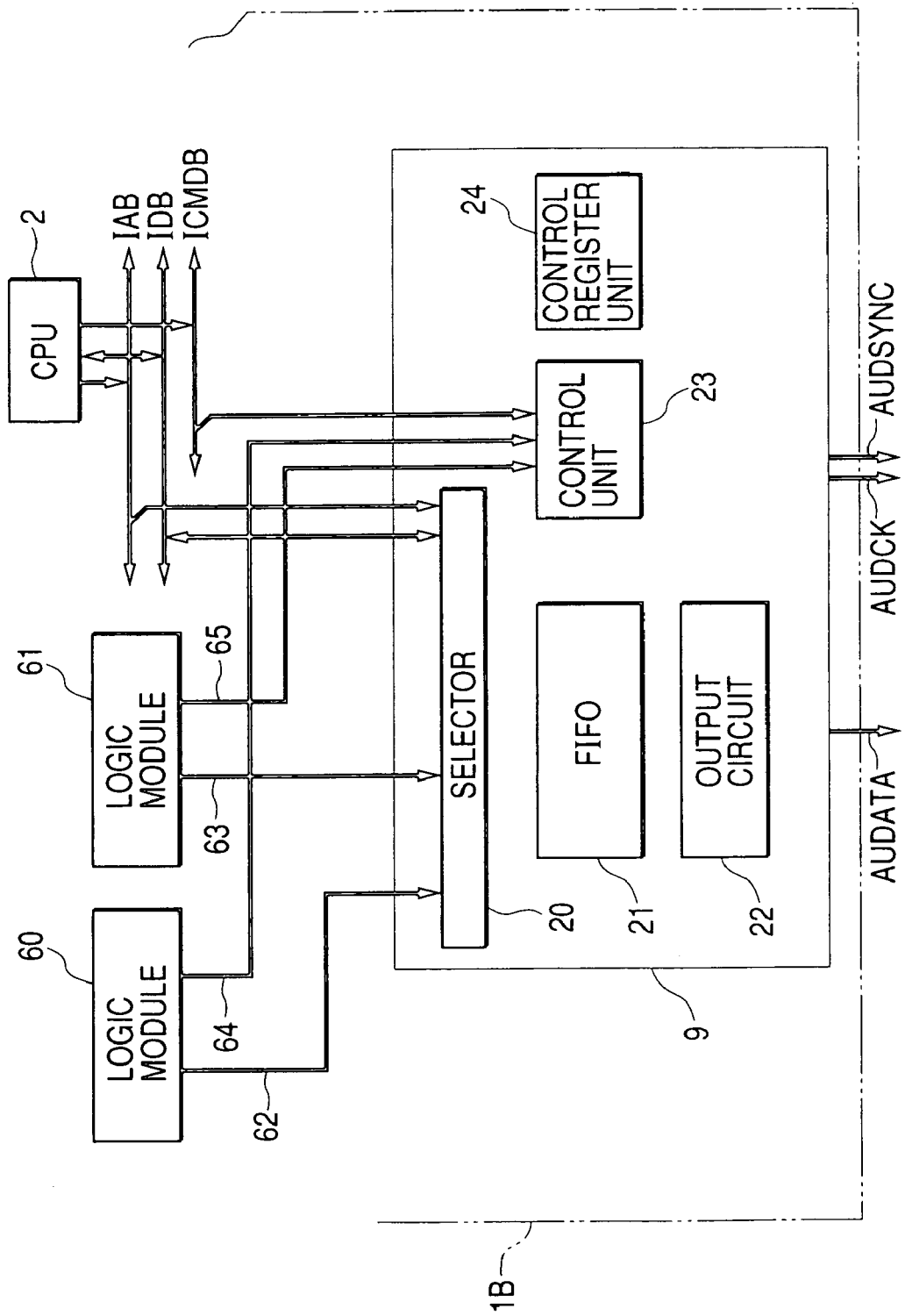
FIG. 17 is a schematic block diagram showing an example of a data processor capable of obtaining trace information not through buses.

In the above description, the trace information is obtained through the address bus and the data bus. FIG. 17 schematically illustrates an example of the configuration of a data processor 1B which enables trace information to be obtained not through a bus. For example, signal lines 62 and 63 through which a signal desired to be traced such as an internal state is transmitted from other circuit modules 60 and 61 such as a timer and a serial interface are connected to the selection circuit. To the control unit 23, a signal defining generation of a signal to be traced (trace event) such as an interruption signal is supplied via signal lines 64 and 65. Consequently, in response to generation of a desired trace event other than the bus access, corresponding event occurrence information can be also stored as trace information into the FIFO buffer circuit. In this case as well, in a manner similar to the above, while a plurality of buses and trace events are monitored in parallel, trace information is obtained. The trace information can be output serially as data AUDATA from the small number of external terminals to the outside.

Although the invention achieved by the inventor herein has been described concretely above on the basis of the embodiment, obviously, the invention is not limited to the embodiment and can be variously modified without departing from the gist.

For example, the other circuit modules are not limited to the DSP and memory but can be variously changed. The configuration of buses as information transmitting paths is not limited to the I bus, X bus, Y bus, and D bus but can be properly changed according to the kind of a built-in circuit module and the like. The format of a packet for outputting the trace information, the kind of code data, definition of the set values of the control registers, and the like can be also properly changed. In the configuration of FIG. 8, two kinds of buses are designated in parallel and information can be traced via the buses. It is also possible to employ a configuration of designating three or more kinds of buses in parallel. The full address information as trace information may be always output without being subjected to the compressing process.

Effects obtained by the representative embodiments of the invention disclosed herein will be briefly described as follows.

Since a set of the information to be traced and its attribute information can be monitored on the outside of the data processor, the information transmitting paths such as a plurality of kinds of internal buses can be monitored on the outside, and each of the information transmitting paths monitored can be identified. Since the trace information and its attribute information is output serially to the outside, the information can be output from the same external terminal. Thus, the situation such that the debugging aid function cannot be provided due to the limitation of the number of external terminals of the package can be reduced.

When it is arranged to select a plurality of information transmitting paths in accordance with the trace condition from the plurality of information transmitting paths and the trace information is obtained in accordance with the trace condition from the selected information transmitting path, a plurality of kinds of information transmitting paths can be monitored in parallel on the outside.

What is claimed is:

1. A data processor formed on a semiconductor chip comprising:
    a first central processing unit;
    a second central processing unit;
    a debugging module including a selection circuit and a buffer circuit;
    a first bus to be coupled to the first central processing unit; and
    a second bus to be coupled to the second central processing unit,
    wherein the debugging module monitors the first bus and the second bus,
    wherein the debugging module monitors a command on the first bus and/or the second bus, traces address information and data information on the first bus and/or the second bus according to a trace condition, and outputs CPU identification information,
    wherein the CPU identification information indicates the data information that either the first central processing unit or the second central processing unit performs an operation corresponding to the trace information, and
    wherein said selection circuit comprises:
        a first selector for selecting a bus for obtaining trace information from the first and/or second buses, holding information of the selected bus on a bus cycle unit basis, and generating a first output;
        a second selector for selecting a bus for obtaining trace information from the first and/or second buses, holding information of the selected bus on the bus cycle unit basis, and generating a second output; and
        a third selector for selecting from a selected output from the first output and the second output and supplying the selected output to the buffer circuit.

2. The data processor according to claim 1, wherein the buffer circuit of the debugging module is a FIFO buffer circuit.

3. The data processor according to claim 2,
    wherein when an access mode designated by the trace condition appears in the same bus cycle in different buses selected by the first selector and the second selector, the debugging module temporarily suspends a new bus access operation and enables information appearing in both of the first and second buses in different access modes and held in the first and second selectors to be stored serially into the buffer circuit via the third selector.

4. The data processor according to claim 3,
    wherein the debugging module is capable of outputting an information code outside of the semiconductor chip, and wherein the information code indicates that the trace information is lost.

5. The data processor according to claim 3,
wherein the debugging module is capable of outputting an information code to the outside of the semiconductor chip, and
wherein the information code indicates that the FIFO buffer circuit is in a full state, and a new access by the first central processing unit or the second central processing unit is temporarily suspended in response to the full state of the FIFO buffer circuit.

6. The data processor according to claim 2,
wherein a control circuit determines whether an accessing operation matching the trace condition has occurred on the basis of access control information supplied via the first and second buses, and is capable of controlling the selection circuit to select a bus used for the accessing operation matching the trace condition.

7. The data processor according to claim 2,
wherein the debugging module includes a control register which has a core select bit to select the first central processing unit or the second central processing unit for the trace condition.

8. The data processor according to claim 2,
wherein the debugging module includes a control register to store the trace condition, and
wherein the trace condition includes core select data which indicates that the first central processing unit or the second central processing unit is to be traced.

9. A data processor built in a semiconductor chip, comprising:
a first CPU;
a second CPU;
a debugging module including a select circuit, a buffer, and a control circuit;
a first bus to be coupled to the first CPU;
a second bus to be coupled to the second CPU;
wherein the select circuit selects a bus in accordance with a trace condition from the first and second buses used for an operation of the first CPU or the second CPU and obtains trace information in accordance with a trace condition from the selected bus,
wherein the buffer holds the trace information selected by the selection circuit and attribute information of the trace information which includes bus identification information indicating a selected bus by the select circuit, and CPU identification information to indicate the first CPU or the second CPU which performs an operation corresponding to the trace information,
wherein the selection circuit comprises:
a first selector for selecting a bus to obtain the trace information from the first and second buses;
a second selector for selecting a bus to obtain the trace information from the first and second buses;
a command address buffer for holding a command address of a command immediately preceding a command address of another command being executed at present; and
a third selector for selecting from the outputs of said first selector, said second selector, and said command address buffer a selected output and supplying the selected output to said buffer circuit,
wherein the control circuit is capable of controlling the first and second selectors to select a bus designated by the trace condition, and is capable of controlling the third selector to output an output of the first selector, the second selector, or the command address buffer in accordance with the appearance of an access mode designated by the trace condition.

10. The data processor according to claim 9,
wherein the debugging module includes a control register which has a core select bit to select the first CPU or the second CPU for the trace condition.

11. The data processor according to claim 10,
wherein the debugging module is capable of outputting an information code outside of the semiconductor chip, and
wherein the information code indicates that the trace information is lost.

12. The data processor according to claim 9,
wherein the debugging module includes a control register to store the trace condition, and
wherein the trace condition includes a core select data which indicates that the first CPU or the second CPU is to be traced.

13. A data processor built in a semiconductor chip comprising:
a first central processing unit;
a debugging module;
a first bus coupled to the first central processing unit and the debugging module; and
a plurality of external terminals coupled to said debugging module,
wherein the debugging module includes a buffer circuit which holds trace information fetched from the first bus and attribute information of the trace information according to a trace condition, and a select circuit,
wherein the attribute information includes identification information which indicates the trace information based on an operation executed by the first central processing unit,
wherein the debugging module outputs the trace information and the attribute information outside of the semiconductor chip via the plurality of external terminals,
wherein the attribute information includes data lost information,
wherein the data lost information indicates that the trace information is not held in the buffer circuit, and
wherein the select circuit comprises:
a first selector for selecting a bus for obtaining trace information from a plurality of buses;
a second selector for selecting a bus for obtaining trace information from the plurality of buses;
a command address buffer for holding a command address of a command immediately preceding a command address of another command being executed at present; and
a third selector for selecting from the outputs of said first selector, said second selector, and said command address buffer a selected output and supplying the selected output to said buffer circuit.

14. The data processor according to claim 13,
wherein the debugging module is capable of outputting an information code outside of the semiconductor chip, and
wherein the information code indicates that the trace information is lost.

15. The data processor according to claim 13,
wherein the debugging module is capable of outputting an information code outside of the semiconductor chip, and
wherein the information code indicates that the FIFO buffer circuit is in a full state, and a new access by the first central processing unit is temporarily suspended in response to the full state of the FIFO buffer circuit.

* * * * *